US005855787A

United States Patent [19]

Giori

[11] Patent Number: 5,855,787

[45] Date of Patent: Jan. 5, 1999

[54] PROCESS FOR PRODUCING A FRESH WIPING SOLUTION AND FOR TREATING A USED SOLUTION AND APPARATUS FOR CARRYING OUT THE PROCESS

[75] Inventor: Fausto Giori, Lausanne, Switzerland

[73] Assignee: De la Rue Giori S.A., Switzerland

[21] Appl. No.: 773,140

[22] Filed: Dec. 26, 1996

[30] Foreign Application Priority Data

Sep. 2, 1996 [CH] Switzerland ............................ 2152/96

[51] Int. Cl.[6] ...................................................... B01D 61/00

[52] U.S. Cl. .......................... 210/651; 210/650; 210/805; 210/208; 210/257.2; 210/195.2; 210/639; 210/641; 210/723; 210/774; 210/175; 134/10

[58] Field of Search .................................... 210/650, 651, 210/805, 208, 195.2, 257.2, 639, 641, 723, 774, 175; 106/30; 101/167; 524/539; 134/10–13

[56] References Cited

U.S. PATENT DOCUMENTS 4,293,416 10/1981 Keoteklian .............................. 210/208
4,938,876 7/1990 Ohsol ...................................... 210/708
4,966,628 10/1990 Amon et al. .............................. 106/30
5,390,598 2/1995 Stauffer .................................. 101/167
5,569,701 10/1996 Moynihan ............................... 524/539

FOREIGN PATENT DOCUMENTS 0 043 624 A1 6/1981 Germany .
0 514 670 A1 4/1992 Germany .

*Primary Examiner*—Ana Fortuna
*Attorney, Agent, or Firm*—Kane, Dalsimer, Sullivan, Kurucz, Levy, Eisele and Richard, LLP

[57] ABSTRACT

A process for producing a fresh wiping solution, comprising at least 90% of water and additives, and for treating said solution once used by the inks of one or more intaglio printing machines, wherein said process comprises the following steps: (a) production of fresh wiping solution, (b) introduction of the fresh wiping solution in one or several wiping tanks and contamination of the fresh wiping solution by the inks, (c) ultrafiltration of the used solution producing a clear solution and a concentrated residual solution, (d) recycling of the clear solution, (e) flocculation of the concentrated residual solution, (f) filtration of the flocculated solution giving solid waste and a filtered solution, (g) neutralization of the filtered solution, (h) evaporation of the neutralized solution producing a concentrated salty solution and distilled water, (i) use of the distilled water for producing fresh wiping solution and (j) filtration of the concentrated salty solution.

18 Claims, 4 Drawing Sheets

State of the art

PROCESS FOR PRODUCING A FRESH WIPING SOLUTION AND FOR TREATING A USED SOLUTION AND APPARATUS FOR CARRYING OUT THE PROCESS

FIELD OF THE INVENTION

The present invention concerns a process for producing a fresh wiping solution, containing at least 90% of water and additives, and for treating this solution once used by the inks of one or more intaglio printing machines working in closed loop and an apparatus for carrying out this process.

PRIOR ART

In intaglio printing machines, the printing plates in which the patterns are engraved are mounted on a plate cylinder and are wiped by a wiping cylinder turning in the same direction as the plate cylinder, the wiping cylinder wiping off the ink being outside the engravings of the printing plates. In order to clean off the ink being on the wiping cylinder, the lower part of the cylinder is in a wiping tank, which is additionally provided with brushes and wiping blades. A nozzle system sprays fresh wiping solution on the wiping cylinder and the fresh solution once mixed with the ink is evacuated from the wiping tank as a used wiping solution.

As an example, U.S. Pat. No. 5,390,598 describes such an installation for permanently cleaning the wiping cylinder in an intaglio printing machine.

Actually, new inks have been developed and these new inks allow to carry out a wiping process using a water-based solution which is far harmless for the environment. These new inks used in the intaglio printing process are known in the art, for example from the patents U.S. Pat. No. 4,966,628 and EP 0 340 163. Such inks comprise among others oleoresinous components and pigments. Water based wiping solutions used in such intaglio printing machines with new inks are also known in the state of the art and they generally contain at least 90% water and additives.

One of these wiping solutions is described in the German patent DE 1 546 776 and is composed of an aqueous solution containing 1 to 5% in weight of alkaline lye, 2 to 10% of a usual cleaning agent comprising alkaline phosphate and 1 to 10% in weight of a wetting agent. More particularly, this aqueous solution contains 1,5 to 2,5% in weight of caustic soda NaOH, 2 to 5% in weight of sodium phosphate $Na_3(PO_4)$ and 1 to 3% in weight of sulphonated castor oil.

Another wiping solution is described in the U.S. Pat. No. 3,389,656 and comprises an aqueous solution containing about 1 to 5% in weight of a strong base, such as potassium hydroxide or sodium hydroxide or caustic ammonia, about 2 to 10% in weight of detergent, for example sodium polyphosphate, and about 0,3 to 10% in weight of a wetting agent such as sulphonated castor oil.

A process for producing fresh wiping solution and for treating used wiping solution known in the state of the art comprises the following steps:

(a) production of fresh wiping solution, (b) introduction of the fresh wiping solution in one or several wiping tanks and contamination by the inks, (c) ultrafiltration of the used solution coming from said one or several wiping tanks, producing a clear solution and a concentrated residual solution, (d) recycling of the clear solution in the circuit of fresh wiping solution, (e) flocculation of the concentrated residual solution derived from the ultrafiltration, (f) filtration of the flocculated solution giving solid waste and a solution, (g) neutralisation of the filtered solution with acid, (h) reduction of the chemical oxygen demand of the neutralised solution and (i) disposal in city drain of the reduced solution.

An example of such a process is given as a block diagram in FIG. 1.

The recycling capacity of this process after ultrafiltration is about 80%, this value depending more or less on the quality of the ink used and its concentration in the wiping solution.

The main drawback of this process is that the residual solution treated and sent to drain contains a great quantity of salts. These salts are principally chlorides originating from the flocculation and neutralisation products, and also sulphates if sulphuric acid has been used for the neutralisation. The presence of important quantities of chlorides and/or sulphates as the chemical demand in oxygen which can be considerably reduced but not entirely removed poses a problem in numerous countries.

Moreover, depending on the number of machines used, the consumption of water and of flocculation products can be important and expensive. Finally, the water used and rejected in the city drain has a biological oxygen demand.

SUMMARY OF THE INVENTION

The object of the present invention is to realise a process working in closed loop, in which in particular the main part of the water and of the flocculation products in the circuit is recovered from the used wiping solution, reused for producing fresh wiping solution and not rejected in the city drain. The water and flocculation products consumption of the process can thus be strongly reduced and only solid waste will be obtained, which can be treated later in the respect of environment protection norms.

The invention allows also to avoid the use of activated carbon for correcting the chemical oxygen demand.

Such a process for producing fresh wiping solution and for treating used wiping solution is defined by the steps of claims 1 and 2.

Dependent claims 3 to 8 define particular steps of the process according to the invention.

Independent claim 9 defines a device for carrying out the process according to the invention.

Dependent claims 10 to 18 define particular embodiments of the device for carrying out the process according to the invention.

BRIEF DESCRIPTION OF THE DRAWINGS

The present invention will be best understood by means of the description of an embodiment and of its accompanying drawings.

DESCRIPTION OF THE PREFERRED EMBODIMENT(S)

The process according to the invention will now be described with reference to FIG. 2.

Preferably, the fresh wiping solution contains the following constituents in the indicated proportion:

softened water 98,5% caustic soda NaOH 1% sulphonated castor oil 0,5%

The wiping solution can also contain some detergent.

In step (a) of the process, the fresh wiping solution is produced by mixing water, caustic soda and sulphonated castor oil. The fresh wiping solution is introduced in one or several wiping tank in step (b) of the process and contaminated by the inks. The used wiping solution is then transferred from the one or several wiping tanks into the ultrafiltration installation for undergoing step (c) of the process, that is an ultrafiltration. This step (c) produces a clear solution which is simply recycled as fresh wiping solution in step (d) of the process and a concentrated residual solution containing ink. This ultrafiltration step allows the recovery of about 80% of the solution. The concentrated residual solution undergoes then the step (e) of the process which is a flocculation. This flocculation is produced by addition of calcium chloride $CaCl_2$ and ferric chloride $FeCl_3$. The solution resulting from the flocculation is then filtered in step (f) of the process and solid waste and a filtered solution are obtained. In step (g), this filtered solution is neutralised by addition of hydrochloric acid HCL. The neutralised solution undergoes in step (h) an evaporation which gives distilled water and a concentrated salty solution. The distilled water is recuperated in order to be used for producing fresh wiping solution in step (i) of the process, whereas the concentrated salty solution is filtered in step (j) of the process and this filtration gives ordinary solid salts and a highly concentrated salty solution which is finally reused for realising the flocculation in step (e) of the process. The distilled water is sent in a tank where it is mixed with softened city water. This mix is used for producing fresh wiping solution by addition of sulphonated castor oil and caustic soda NaOH, in the proportions indicated above for example.

Since this process allows the recycling of nearly all the water, the consumption of water taken from the city water will be very low and will only compensate losses.

Figure 1:
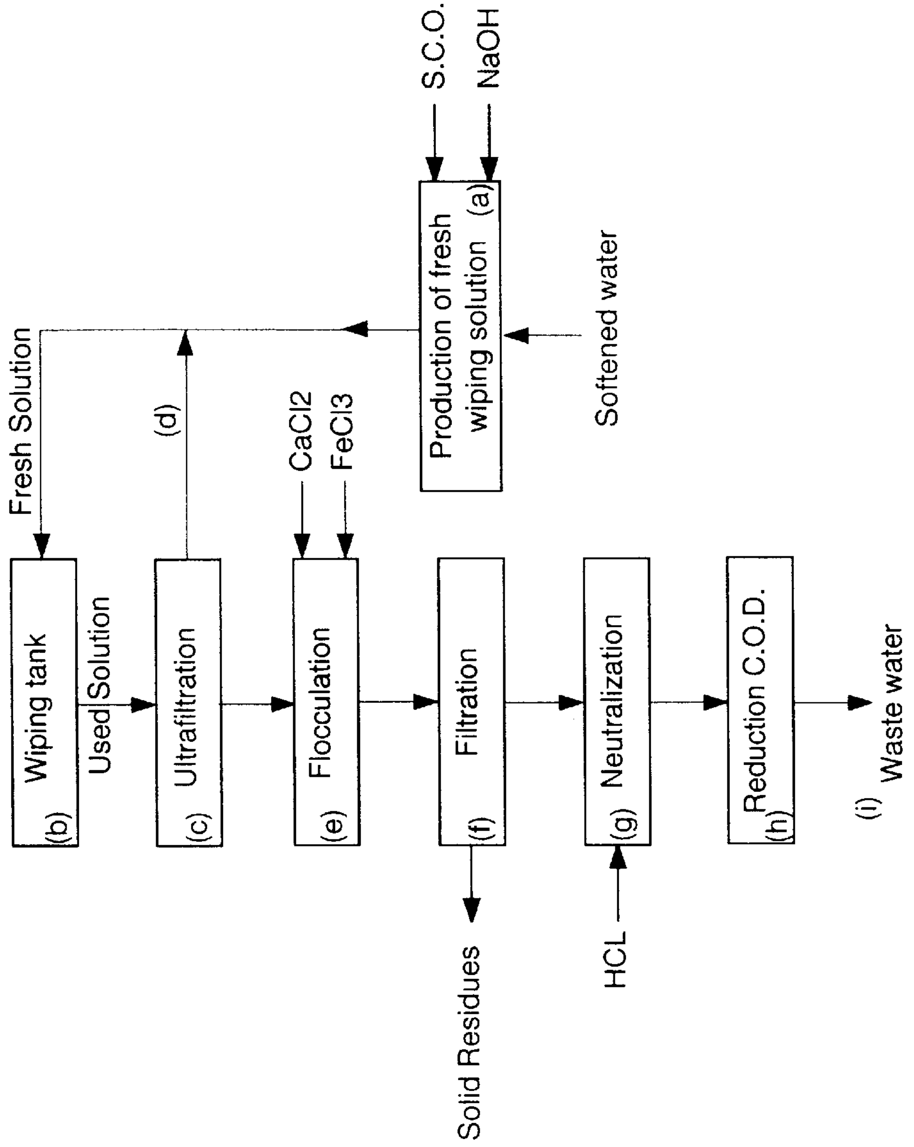
FIG. 1 shows a block diagram of a process known in the state of the art for treating wiping solution.
Figure 2:
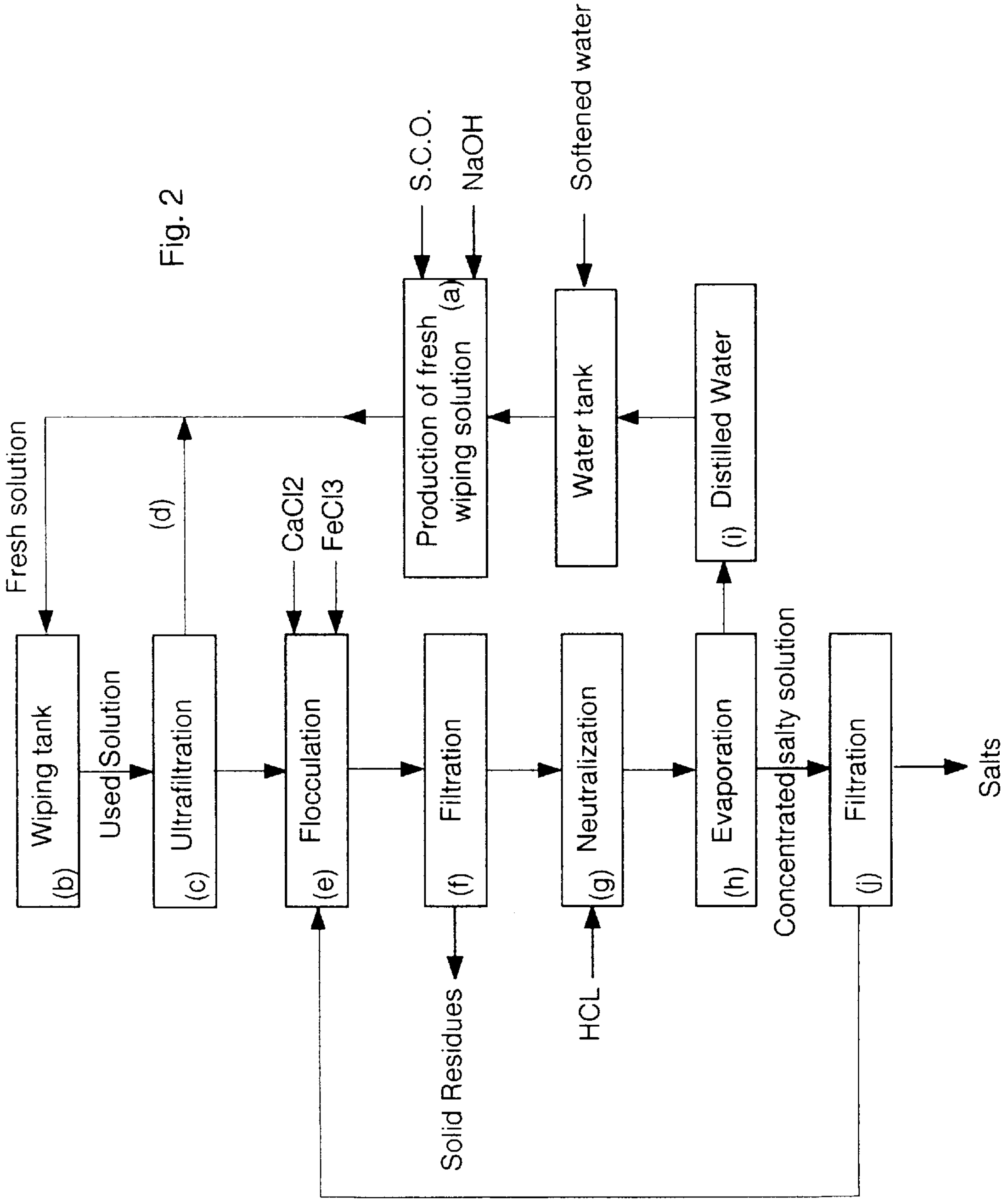
FIG. 2 shows a block diagram of a process for producing and recycling wiping solution according to the invention.

Moreover, when considering the arrows leaving the block diagram of FIG. 2, it can clearly be seen that only solid waste is not reused in this process, whereas liquid remains in a closed loop.

Figure 3A:
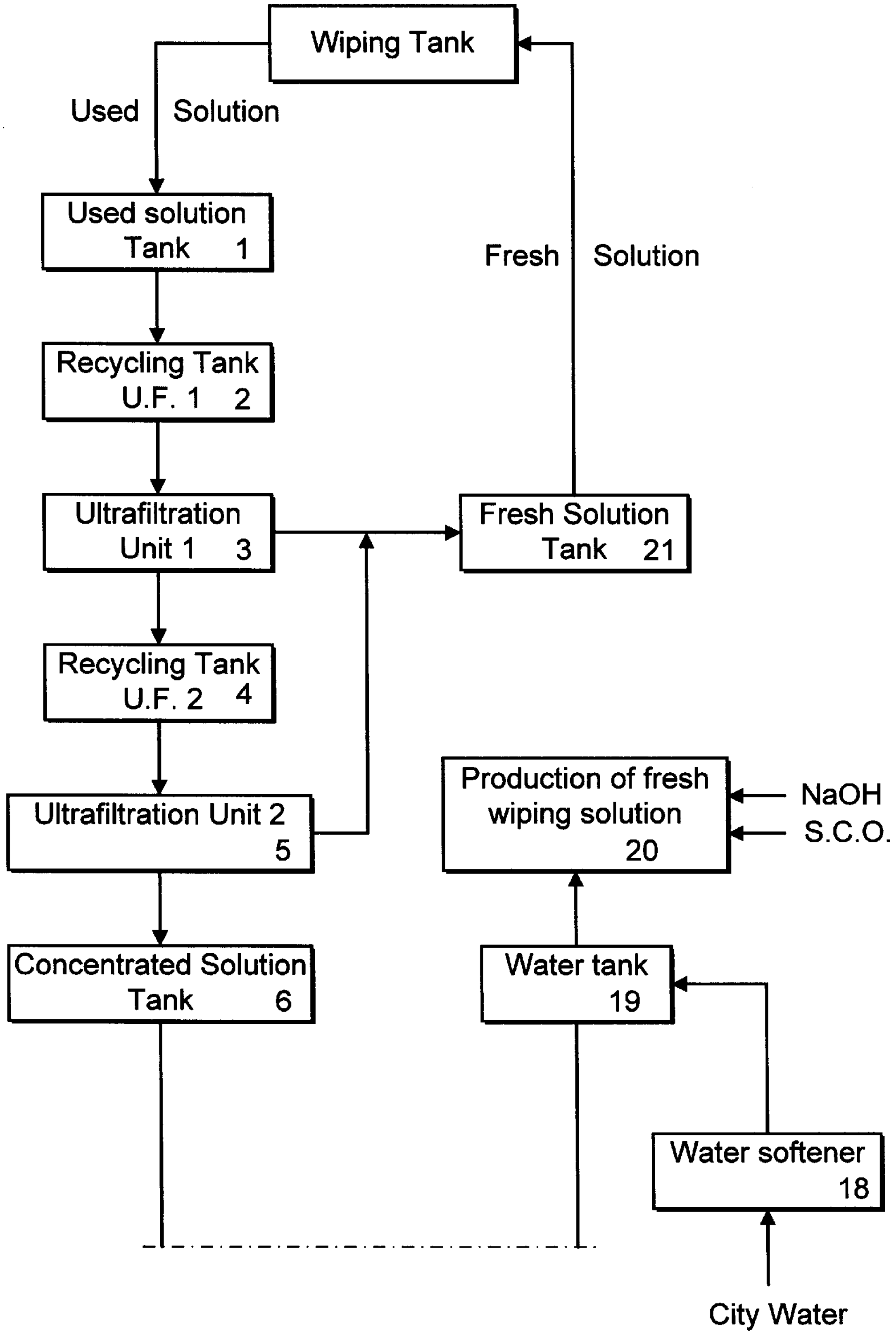
FIG. 3 is the block diagram of an apparatus for carrying out the process according to the invention.
Figure 3B:
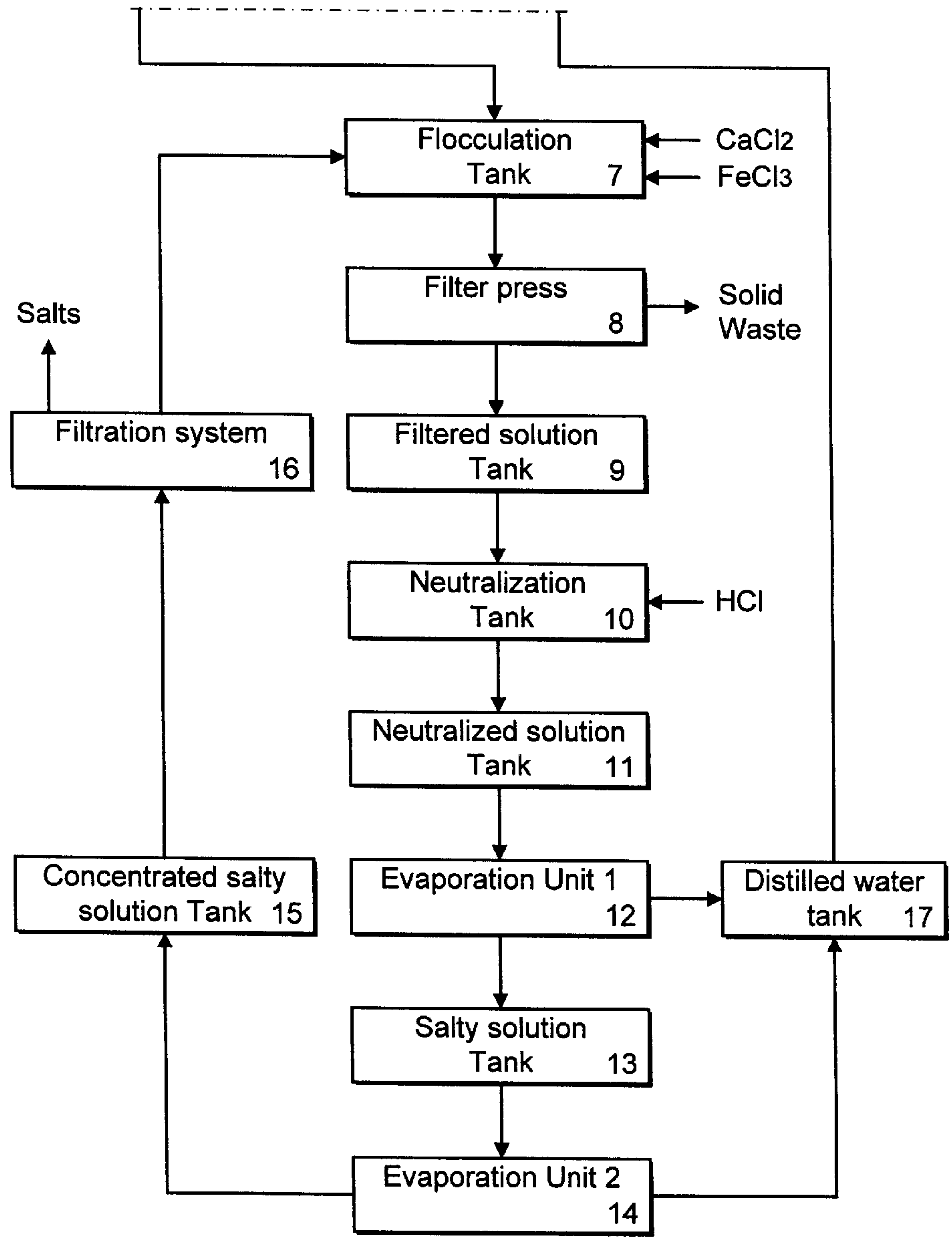
Figure 3A:
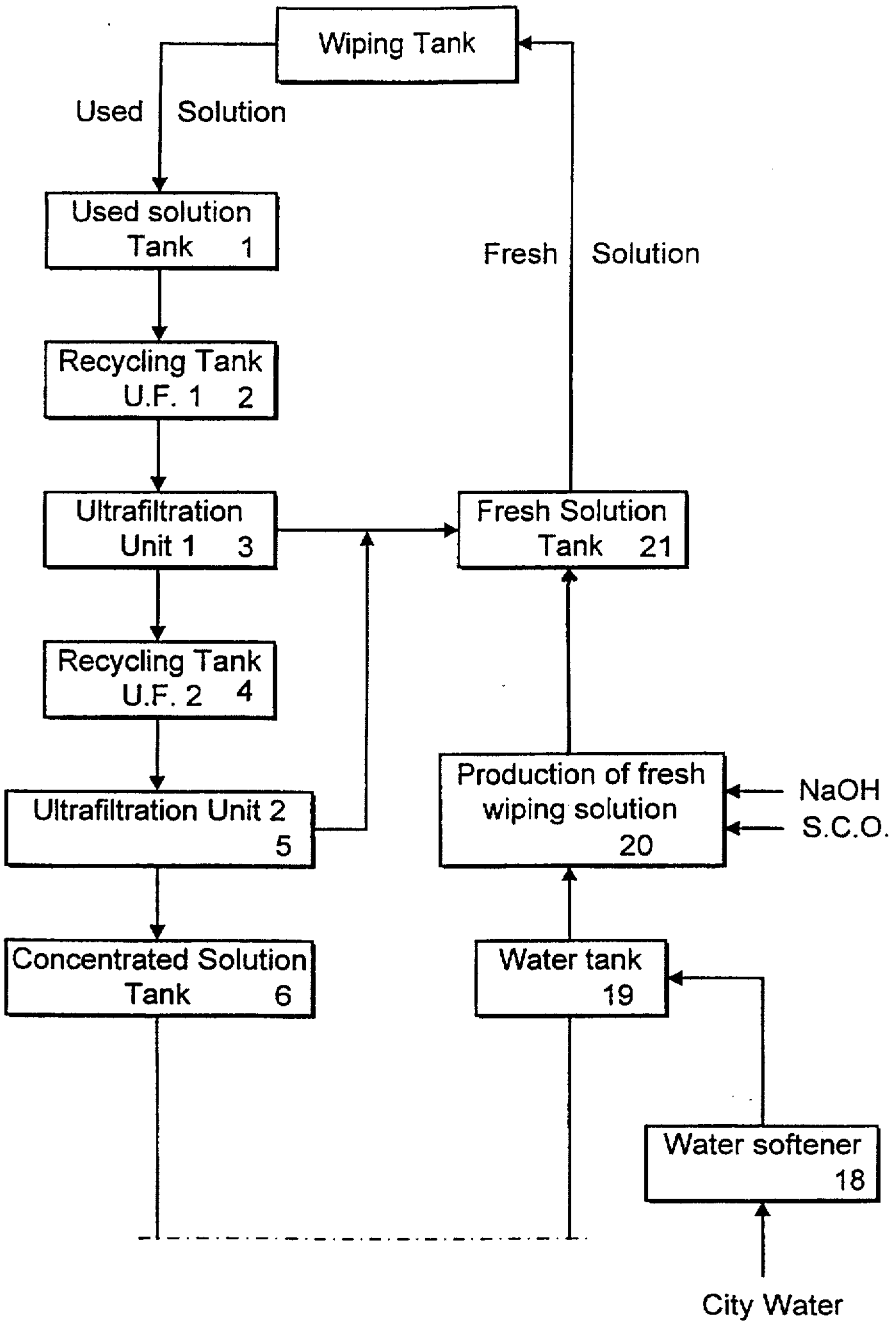

FIG. 3 represents an example of an apparatus for carrying out the process.

The apparatus comprises a used solution tank 1 through which the used solution passes and is brought in a first ultrafiltration tank 2, from which it passes then in a first ultrafiltration unit 3. The clear solution exiting from this first ultrafiltration unit 3 is brought in a fresh solution tank 21 from where it is reused as fresh wiping solution, whereas the concentrated residual solution exiting from this first ultrafiltration unit 3 is sent into a second ultrafiltration tank 4 and from there into a second ultrafiltration unit 5. The clear solution coming from this second ultrafiltration unit 5 is also brought into the fresh solution tank 21 from where it is reused as fresh wiping solution, whereas the concentrated residual solution exiting from this second ultrafiltration unit 5 is sent into a concentrated solution tank 6. This concentrated residual solution passes then in the flocculation tank 7 where the flocculation step is executed. Means for adding calcium chloride $CaCl_2$ and ferric chloride $FeCl_3$ necessary for flocculation are provided on the flocculation tank 7. These means comprise at least a tank and a dosing pump for each added compound. The flocculated solution is then brought in a filter press 8 separating solid waste from the solution. The filtered solution is stored in a filtered solution tank 9. This filtered solution is brought in a neutralisation tank 10 where it is neutralised by addition of hydrochloric acid and recuperated in a neutralised solution tank 11. For this purpose, means for adding hydrochloric acid are provided on the neutralisation tank 10. These means comprise at least a tank and a dosing pump. From this neutralised solution tank 11, the solution is sent into a first evaporation unit 12 and the vapour obtained from this first evaporation unit 12 is recuperated in a distilled water tank 17, whereas the salty solution goes into a salty solution tank 13 and then into a second evaporation unit 14. The vapour obtained from this second evaporation unit 14 is also recuperated in the distilled water tank 17, whereas the concentrated salty solution is brought into a concentrated salty solution tank 15 and then into a filtering system, from which on one side solid salts are extracted, and on the other side, a residual liquid which is recycled by appropriate means, for example a pump, in the flocculation tank 7. From the distilled water tank 17, the water is sent into a water tank 19, which also receives the city water once it has passed through a water softener 18, and both the softened water and the distilled water are sent into a wiping solution mixing tank 20 where fresh wiping solution is prepared by addition of sulphonated castor oil and caustic soda. The fresh wiping solution is then finally brought into the fresh solution tank 21 and returns into the one or several used solution tank once used.

In order to carry out the transfer of the solutions in the different tanks of the apparatus, pumping means are provided.

The different embodiments described are given as examples and variations within the scope of protection are possible. For example, the proportion of the constituents of the wiping solution can be slightly changed. Furthermore, the acid used for the neutralisation can be sulphuric acid.

I claim:

1. A process for treating a wiping solution, comprising at least 90% of water and additives, introduced in one or several wiping tanks and used by the inks of one or more intaglio printing machines, wherein said process comprises the following steps:

(a) ultrafiltration of the used solution coming from said one or several wiping tanks, producing a clear solution and a concentrated residual solution, (b) recycling of the clear solution in the circuit of fresh wiping solution, (c) flocculation of the concentrated residual solution derived from the ultrafiltration, (d) filtration of the flocculated solution giving solid waste and a filtered solution, (e) neutralisation of the filtered solution with acid, (f) evaporation of the neutralised solution producing a concentrated salty solution and distilled water, (g) use of the distilled water for producing fresh wiping solution, (h) filtration of the salty solution producing solid salts and a residual liquid.

2. Process as claimed in claim 1 wherein the residual liquid produced in step (j) is reused for realising the flocculation of step (e).

3. Process as claimed in claim 1, wherein the fresh wiping solution contains softened water, sulphonated castor oil and caustic soda NaOH.

4. Process as claimed in claim 3, wherein the fresh wiping solution contains about 98,5% of aqueous solution, about 1% of caustic soda NaOH and about 0,5% of sulphonated castor oil.

5. Process as claimed in claim 1, wherein the flocculation is produced by addition of calcium chloride $CaCl_2$ and ferric chloride $FeCl_3$.

6. Process as claimed in claim 1, wherein the neutralisation is realised with the addition of hydrochloric or sulphuric acid.

7. Process as claimed in claim 1, wherein said process comprises two successive ultrafiltration steps.

8. Process as claimed in claim 1, wherein said process comprises two successive evaporation steps.

9. Apparatus for producing a fresh wiping solution and for treating the wiping solution once used, wherein said apparatus at least comprises a fresh solution tank (21), a used solution tank (1) recuperating the used wiping solution, an ultrafiltration recycling tank (2) receiving the used wiping solution from the used solution tank (1), an ultrafiltration unit (3) connected to the ultrafiltration tank (2), said ultrafiltration unit (3) having an outlet delivering a clear solution and linked to the fresh solution tank (21) and another outlet delivering a concentrated residual solution and linked to a concentrated solution tank (6), a flocculation tank (7) in which the flocculation of the residual solution is carried out, a filter press (8) filtering the flocculated residual solution, a filtered solution tank (9) receiving the solution exiting the filter press (8), a neutralisation tank (10) in which the filtered solution is neutralised and followed by a neutralised solution tank (11), an evaporation unit (12) receiving the neutralised solution from the neutralised solution tank (11), a distilled water tank (17) receiving the water of the evaporation unit (12), a concentrated salty solution tank (13) receiving the salty solution from the evaporation unit (12), a filtration system (16) filtering the concentrated salty solution and producing solid salts and a residual solution.

10. Apparatus as claimed in claim 9, further comprising means for bringing the filtered residual liquid from the filtration system (16) into the flocculation tank (7).

11. Apparatus as claimed in claim 9, further comprising a water tank (19) receiving softened water from a water softener (18) and the distilled water from the distilled water tank (17), a tank for production of fresh wiping solution (20) receiving the water from the water tank (19) and linked to the fresh solution tank (21).

12. Apparatus as claimed in claim 9, wherein the fresh wiping solution contains softened water, sulphonated castor oil and caustic soda NaOH.

13. Apparatus as claimed in claim 12, wherein the fresh wiping solution contains about 98,5% of aqueous solution, about 1% of caustic soda NaOH and about 0,5% of sulphonated castor oil.

14. Apparatus as claimed in claim 9, further comprising means for adding caustic soda NaOH and sulphonated castor oil in the tank for production of fresh wiping solution (20).

15. Apparatus as claimed in claim 9, further comprising means for adding calcium chloride $CaCl_2$ and ferric chloride $FeCl_3$ in the flocculation tank (7).

16. Apparatus as claimed in claim 9, further comprising means for adding hydrochloric acid or sulphuric acid in the neutralisation tank (10).

17. Apparatus as claimed in claim 9, further comprising a second ultrafiltration recycling tank (4) and a second ultrafiltration unit (5) following said ultrafiltration unit (3) and wherein the outlet of said second ultrafiltration unit is linked to said fresh solution tank (21).

18. Apparatus as claimed in claim 9, further comprising a second evaporation unit (14) following said evaporation unit (12) and wherein the distilled water tank (17) receives the water of said second evaporation unit (14).

* * * * *

UNITED STATES PATENT AND TRADEMARK OFFICE

CERTIFICATE OF CORRECTION

PATENT NO. : 5,855,787

DATED : January 5, 1999

INVENTOR(S) : Fausto Giori

It is certified that error appears in the above-indentified patent and that said Letters Patent is hereby corrected as shown below:

With regard to Figure 3A, an upward pointing arrow should be inserted from box number 20 to box number 21 as indicated on the attached sheet.

Signed and Sealed this

Twenty-eighth Day of September, 1999

*Attest:*

Q. TODD DICKINSON

*Attesting Officer*

*Acting Commissioner of Patents and Trademarks*